(12) United States Patent  
Burns

(10) Patent No.: US 8,047,554 B2  
(45) Date of Patent: Nov. 1, 2011

(54) STRAP SYSTEM AND METHOD OF USE

(76) Inventor: Timothy Allan Burns, Racine, WI (US)

(*) Notice: Subject to any disclaimer, the term of this patent is extended or adjusted under 35 U.S.C. 154(b) by 1216 days.

(21) Appl. No.: 11/538,379

(22) Filed: Oct. 3, 2006

(65) Prior Publication Data

US 2007/0084894 A1  Apr. 19, 2007

Related U.S. Application Data

(60) Provisional application No. 60/723,099, filed on Oct. 3, 2005.

(51) Int. Cl.
*B62B 1/04* (2006.01)

(52) U.S. Cl. ............... 280/47.18; 224/401; 24/265 CD; 414/448

(58) Field of Classification Search ............. 280/47.131, 280/47.17, 47.18, 47.19, 47.23, 47.24, 47.27; 24/265 CD; 414/444, 448, 457; 224/401
See application file for complete search history.

(56) References Cited

U.S. PATENT DOCUMENTS

| | | | | |
|---|---|---|---|---|
| 3,865,392 A * | 2/1975 | Hartway | ................. | 280/35 |
| 4,518,107 A * | 5/1985 | Amos | ................. | 224/586 |
| 4,593,841 A * | 6/1986 | Lange | ................. | 224/153 |
| 5,024,458 A * | 6/1991 | Kazmark et al. | ................. | 280/645 |
| 5,465,987 A * | 11/1995 | DellaVecchia | ................. | 280/47.28 |
| 5,809,620 A * | 9/1998 | Crowley et al. | ................. | 24/302 |
| 5,954,254 A * | 9/1999 | Maeng | ................. | 224/645 |
| 5,996,871 A * | 12/1999 | Maeng | ................. | 224/645 |
| 6,705,621 B1 * | 3/2004 | Drayer | ................. | 280/30 |
| 7,017,939 B2 * | 3/2006 | Darling, III | ................. | 280/652 |
| 7,171,731 B1 * | 2/2007 | Borcherding | ................. | 24/302 |
| 2002/0138952 A1 * | 10/2002 | Chou | ................. | 24/300 |
| 2008/0127461 A1 * | 6/2008 | Linden et al. | ................. | 24/302 |
| 2008/0257922 A1 * | 10/2008 | Cragg | ................. | 224/269 |
| 2009/0233535 A1 * | 9/2009 | Boduch | ................. | 452/187 |

* cited by examiner

*Primary Examiner* — Jeffrey J Restifo  
(74) *Attorney, Agent, or Firm* — Jansson Shupe & Munger Ltd.

(57) ABSTRACT

A strap system for securing an object to a dolly. The strap system includes a first strap section having first and second ends and releasably attached to the dolly at the first end and a second strap section having first and second ends and releasably attached to the dolly at the first end. The second end of the first strap section and the second end of the second strap section are releasably attached to each other.

10 Claims, 3 Drawing Sheets

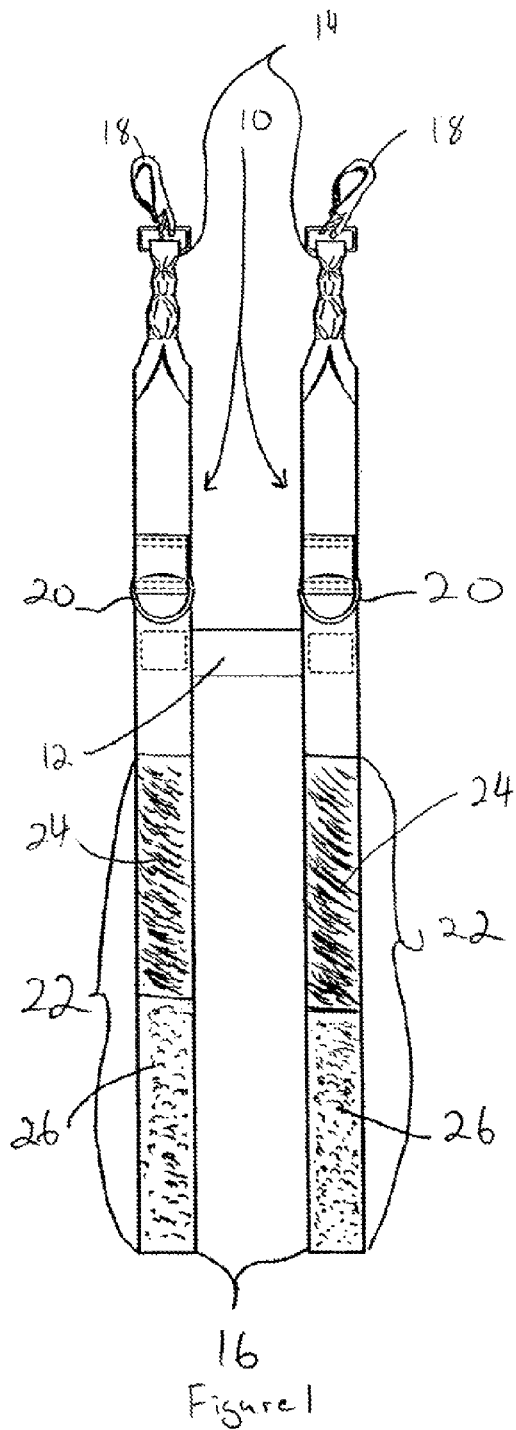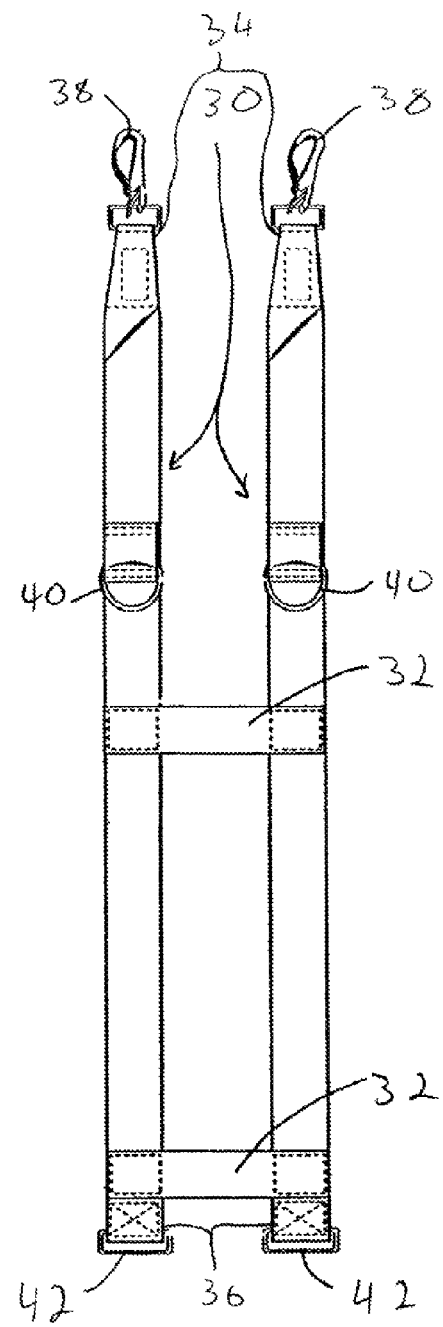
Figure 1
Figure 2

STRAP SYSTEM AND METHOD OF USE

This application claims the benefit of U.S. Provisional Application Ser. No. 60/723,099, filed Oct. 3, 2005, the contents of which are incorporated herein.

FIELD OF THE INVENTION

This invention is related generally to moving devices and, more particularly, to methods and apparatuses for securing object to a dolly.

BACKGROUND OF THE INVENTION

In the moving of large objects, such as furniture, washing machines and the like, safety and making the move as easy as possible are the primary concerns. Moving large objects by hand obviously is highly inefficient and dangerous since the move would require multiple people and the object could fall and potentially injure the movers.

As such, dolly or hand carts have been utilized to lift the objects and allow them to be pulled along on the wheels, however even when using a dolly or cart the object still in prone to movement since it is unsecured. Along that line, straps are known in the art which that can be affixed to the cart and will tighten the object to the cart through the use of rackets and other more complex tightening systems.

While these products have been developed, a need exists for an improved strap system that is easy to use, releasable from the dolly or cart and has no moving parts, thereby making it cheap to manufacture.

OBJECTS OF THE INVENTION

It is an object of the invention to provide a strap system and method of use that overcomes some of the problems and shortcomings of the prior art, including those referred to above.

Another object of the invention is to provide a strap system and method of use that is easily releaseable from a dolly.

Yet another object of the invention is to provide a strap system and method of use that includes no moving parts.

How these and other objects are accomplished will become apparent from the following descriptions and the drawings.

SUMMARY OF THE INVENTION

The present invention provides a strap system for securing an object to a dolly. The strap system includes a first strap section having first and second ends and releasably attached to the dolly at the first end and a second strap section having first and second ends and is releasably attached to the dolly at the first end. The second end of the first strap section and the second end of the second strap section are releasably attached to each other.

In a highly preferred embodiment of the invention the strap system includes two of the first strap sections that are connected together by at least one connection strap between them and two of the second strap sections that are connected together by at least one connection strap between them. This embodiment also includes a clasp hook that is attached at the first ends of both the first and second strap sections. The strap system then further includes a ring attached to both of the first and second strap sections between the first and second ends of the first and second strap sections. Also, the first strap section includes a VELCRO section (sometimes referred to herein as a VELCRO "portion") between the second end and the ring, wherein the VELCRO section includes a length of VELCRO hooks and a length of VELCRO loops. "VELCRO" is a registered trademark for the best known hook-and-loop fasteners. In this document, it should be understood that any appropriate sort of hook-and-loop fasteners can be used, even though reference is primarily made to VELCRO fasteners. Corresponding to the VELCRO length, the second ends of the second strap sections include VELCRO-receiving.

Also disclosed is a inventive method of securing an object to a dolly having an upright portion. A strap system is provided which includes a first strap section having first and second ends and a second strap section including first and second ends. The second ends of the first and second strap sections are capable of being releasably attached to each other. The first end of the first strap section is then releasably attached to the dolly. The first end of the second strap section is then releasably attached to the dolly. The object to be moved is then placed adjacent to the upright portion of the dolly and the first and second strap section are positioned around the object. Finally the second ends of the first and second strap sections are releasably secured to one another.

BRIEF DESCRIPTION OF THE DRAWINGS

FIG. 1 is a plan view of the first strap section of a preferred embodiment of the current invention.

FIG. 2 is a plan view of the corresponding second strap section of embodiment of FIG. 1.

DETAILED DESCRIPTION OF THE PREFERRED EMBODIMENTS

Figure 3:
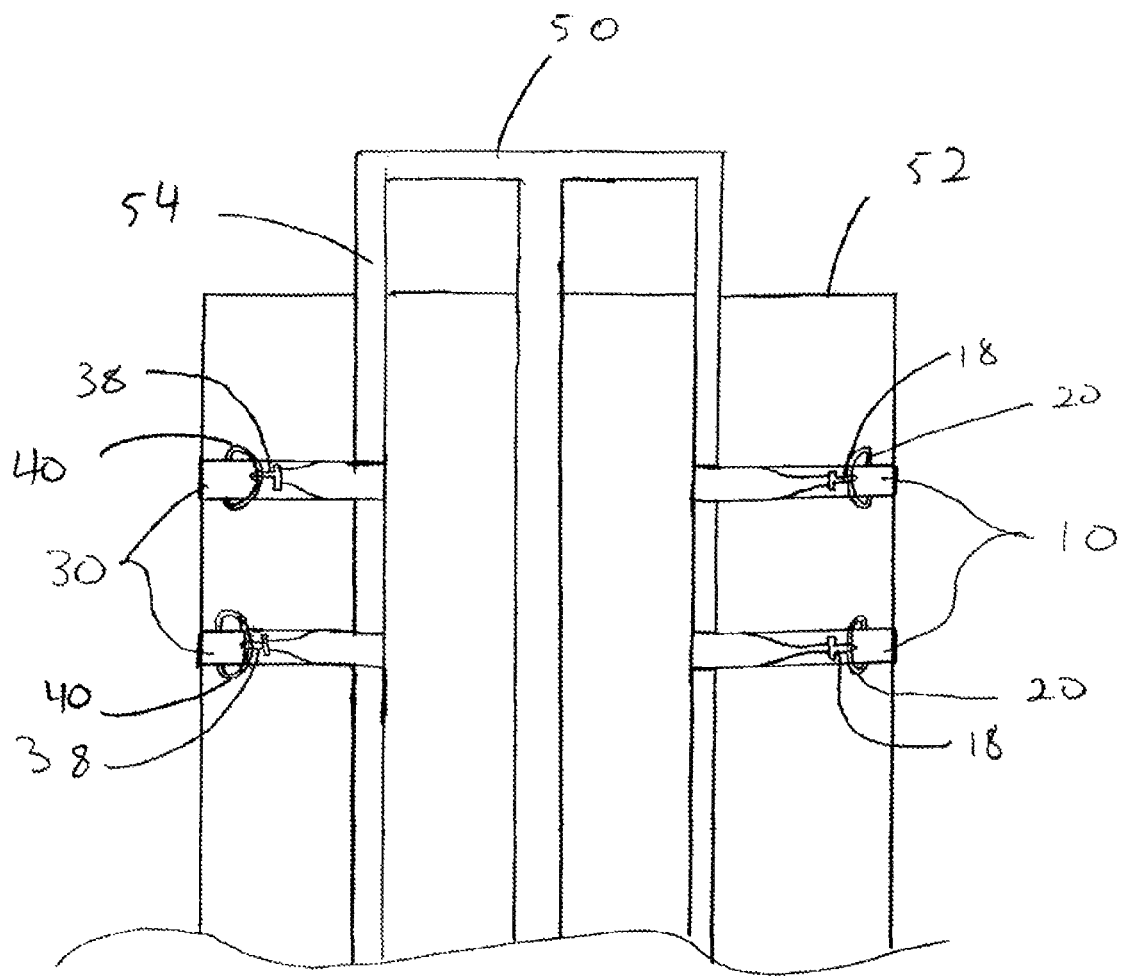
FIG. 3 is a back side view of the embodiment of FIGS. 1 and 2 in use.

FIGS. 1 and 2 illustrate a preferred embodiment of the strap system of the of the current invention. The strap system is comprised of two first strap sections 10 and two second strap sections 30. The strap sections are be made of any material capable of handling the loads needed, however preferably the straps are made from nylon. Most preferably the straps are made of nylon rated at 1050-lbs. As seen in FIG. 1 the two first strap sections 10 are connected together by a connection strap 12. Each of the first strap sections 10 includes a first end 14 and a second end 16.

The first ends 14 of the first strap sections 10 are adapted to be easily connected and disconnected to a dolly. This releasable connection can be accomplished by any known method of easy attachment. In this preferred embodiment, the first ends 14 are attached to clasp hooks 18. Rings 20 are also attached further down the length of the first strap sections 10 to receive the clasp hooks 18 in use, as will be discussed below. The first strap sections 10 further include VELCRO strips 22 which include both a hook section 24 and a loop section 26.

Referring now to FIG. 2 the two second strap sections 30 are shown. The two second strap sections 30 are connected together by connection straps 32. Each of the second strap sections include a first end 34 and a second end 36. The first ends 34 of the second strap sections 30 are adapted to be easily connected and disconnected to a dolly. This releasable connection is preferably identical in the releasable connection of the first strap section, but can be accomplished by any known method of easy attachment. In this preferred embodiment, the first ends 34 are attached to clasp hooks 38. Rings 40 are also attached further down the length of the second strap sections 30 to receive the clasp hooks 38 in use, as will be discussed below. The second strap sections 30 further include a VELCRO-receiving ring 42 at the second ends 36.

Figure 4:
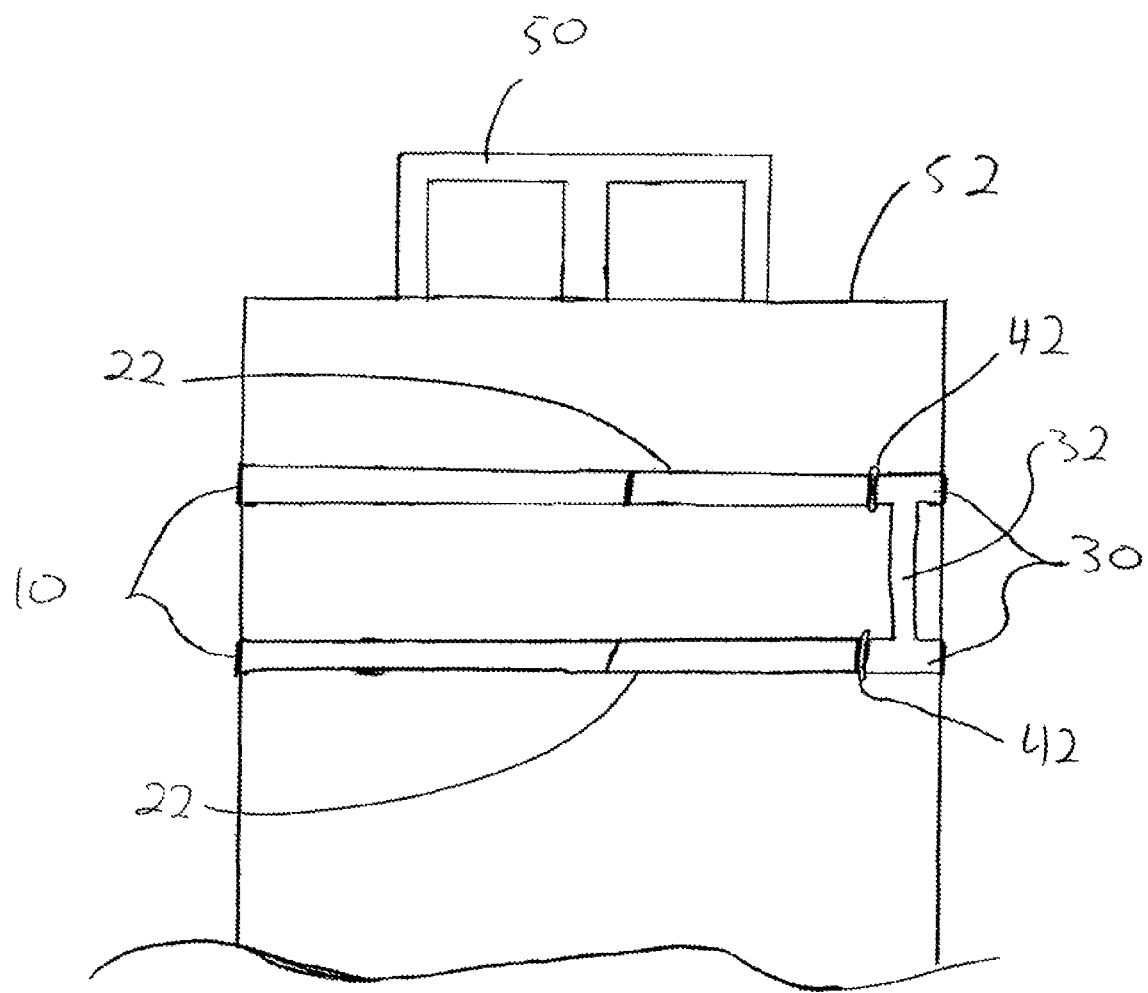
FIG. 4 is a front side view of the embodiment of FIGS. 1 and 2 in use.

Referring now to FIGS. 3 and 4, the preferred embodiment, seen in FIGS. 1 and 2, is shown in use. The strap system is designed to be used in conjunction with a dolly 50 in order to secure and move a large object 52. The dolly comprises a lower portion (not shown) and an upper portion 54. Referring now to FIG. 3, the first strap sections 10 are releaseably attached to the upper portion 54. This is accomplished by wrapping the first end 14 of each of the first strap sections 10 around the upper portion 54 and attaching each clasp hook 18 to its respective ring 20. Next, the second strap sections 30 are releaseably attached to the upper portion 54. This is accomplished by wrapping the first end 34 of each of the second strap sections 30 around the upper portion 54 and attaching each clasp hook 38 to its respective ring 40.

Next, the large object 52 is positioned adjacent the dolly 50 and the first and second straps sections 10, 30 are positioned around the large object 52 so that they line up with each other in the front of the object 54 as shown in FIG. 4. Finally the second ends 16 of the first strap sections 10 are releasably attached to the second ends 36 of the second strap sections 30. This is accomplished by inserting each of the second ends 16 of the first strap sections 10 into its aligned VELCRO-receiving ring 42, pulling the first strap sections 10 tight and folding the first strap sections 10 so that the VELCRO hooks 24 and VELCRO loops 26 of each first strap section 10 come in contact with each other and secure the object 52 to the dolly 50.

While the principles of the invention have been shown and described in connection with specific embodiments, it is to be understood that such embodiments are by way of example and are not limiting.

I claim:

1. A method of securing an object to a dolly having an upright portion, the method comprising:
   providing a strap system including a first strap section having first and second ends and a second strap section having first and second ends wherein the second ends of the first and second strap sections are capable of being releasably attached to each other, the first and second strap sections each having a clasp hook attached at the first end thereof and a ring attached between the first and second ends thereof, the second end of the first strap section having a hook-and-loop fastener portion with a hook-portion length and a loop-portion length, and the second end of the second strap section having a hook-and-loop fastener receiving ring attached thereto;
   releasably attaching the first end of the first strap section to the dolly by wrapping the first end of the first strap section around the upright portion of the dolly and connecting the clasp hook at such first end to the ring of the first strap section;
   releasably attaching the first end of the second strap section to the dolly by wrapping the first end of the second strap section around the upright portion of the dolly and connecting the clasp hook at such first end to the ring of the second strap section;
   placing the object adjacent to the upright portion of the dolly;
   positioning the first and second strap sections around the object; and
   releasably attaching the second end of the first strap section to the second end of the second strap section by inserting part of the velcro portion of the first strap section through the hook-and-loop fastener receiving ring, and folding the hook-and-loop fastener over onto itself, thereby connecting at least some of the loop-portion length to the hook-portion length.

2. The method of claim 1 wherein:
   the strap system further includes two first strap sections, the two first strap sections being connected together by at least one connection strap between the first and second ends and two of the second strap sections, the two first strap sections being connected together by at least one connection strap;
   the step of releasably attaching the first end of the first strap section to the dolly further includes releasably attaching both of the first ends of the first strap sections to the dolly;
   the step of releasably attaching the first end of the second strap section to the dolly further includes releasably attaching both the first ends of the first strap sections to the dolly;
   the step of positioning the first and second strap sections around the object further includes positioning both first and both second strap sections around the object; and
   the step of releasably attaching the second end of the first strap section to the second end of the second strap section further includes releasably attaching both second ends of the first strap sections to separate second ends of the second strap sections.

3. The method of claim 2 wherein the first and second strap sections are made from nylon.

4. The method of claim 3 wherein the nylon is rated at least 1050 pounds.

5. The method of claim 1 wherein the first and second strap sections are made from nylon.

6. The method of claim 5 wherein the nylon is rated at least 1050 pounds.

7. The method of claim 1 wherein the hook-portion length of is at least two feet long.

8. The method of claim 7 wherein the loop-portion length of is at least two feet long.

9. The method of claim 2 wherein the hook-portion length of is at least two feet long.

10. The method of claim 9 wherein the loop-portion length of is at least two feet long.

* * * * *